Figure 1:
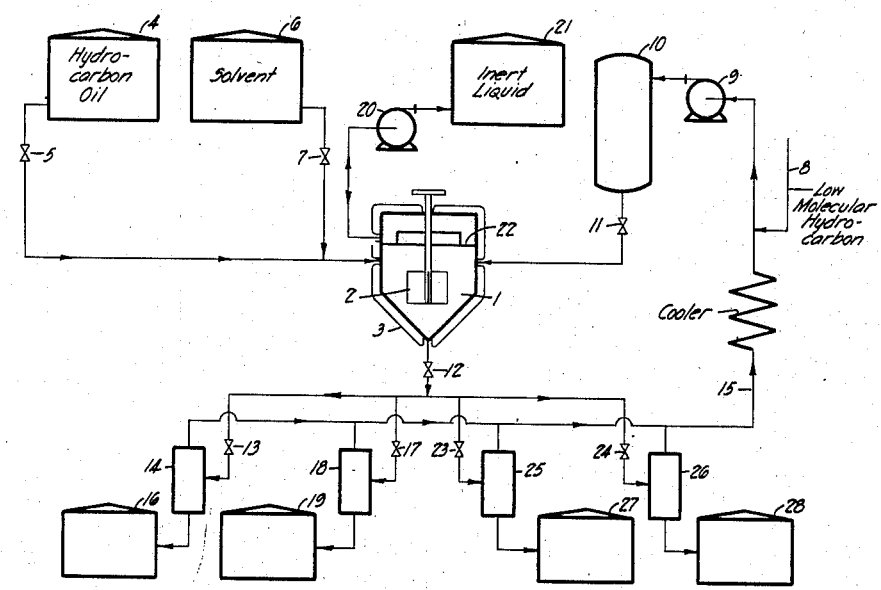

Aug. 19, 1941.　　　A. SCHAAFSMA　　　2,252,864
PROCESS FOR SEPARATING HIGH MOLECULAR MIXTURES

Filed March 24, 1936

Inventor: Albert Schaafsma
By his Attorney:

Patented Aug. 19, 1941

2,252,864

UNITED STATES PATENT OFFICE 2,252,864

PROCESS FOR SEPARATING HIGH MOLECULAR MIXTURES

Albert Schaafsma, Amsterdam, Netherlands, assignor to Shell Development Company, San Francisco, Calif., a corporation of Delaware Application March 24, 1936, Serial No. 70,598
In the Netherlands March 30, 1935

1 Claim. (Cl. 196—13)

This invention relates to improvements in the method of separating mixtures of high molecular hydrocarbon substances, such as petroleum oils, shale oils, oil fractions obtained by distillation of crude oils, shale oils, coal tar oils, into fractions having different compositions and physical and/or chemical properties. The initial mixture to be separated should be liquid at the temperature of the treatment, or be capable of being dissolved in a suitable solvent.

A number of methods employing various liquid solvents is known for effecting the separation of high molecular mixtures, such as hydrocarbon oils, into several portions of different compositions. Thus, it is known to effect the separation of substances in the solid state, e. g., asphaltic or resinous substances, as well as paraffin wax, from hydrocarbon oils by dissolving the oil in a liquid precipitant for the solid substances, such as liquefied butane, ethane, and the like, either at ordinary or reduced temperatures. It is further known that asphaltic substances can be separated either at ordinary or slightly elevated temperatures.

It is, moreover, known to effect the fractionation of high molecular hydrocarbon mixtures by adding methane or ethane to the hydrocarbon mixture or to the solution of the hydrocarbon mixture in suitable solvents, whereby the density of the mixture is lowered, and the high molecular mixture is caused to separate into two liquid phases of different specific gravities. The successive fractionation of the mixture is, in this type of process, effected by introducing more gas into the mixture or into a lighter liquid phase which was formed in a previous stage.

It is, moreover, known to separate hydrocarbon oils into fractions which are, respectively, more aromatic or naphthenic and more paraffinic than the original oil by contacting the oil with a selective solvent for the naphthenic or aromatic hydrocarbons, such as sulfur dioxide or furfural, thereby forming extract phases and raffinate phases, the latter containing the more paraffinic hydrocarbons which are not preferentially dissolved in the selective solvent, and the extract phase containing the naphthenic or aromatic hydrocarbons, which have relatively greater internal pressures. Certain of these processes employ different temperatures in different stages of the process, and in certain modes of operation the selective solvent, such as sulfur dioxide, is introduced into the oil in the gaseous state. In these operations, however, the solvents are employed at temperatures far below their critical temperatures, and, upon being mixed with the oil, behave in a manner similar to liquid selective solvents for aromatic or naphthenic hydrocarbons, in that they preferentially dissolve the hydrocarbons which are relatively more polarizable and/or which have higher internal pressures. Thus, in these processes, increasing the quantity of the gaseous selective solvent in the oil has the effect of dissolving additional quantities of the hydrocarbons of high internal pressures in the extract phase which contains the major portion of the solvent.

It is an object of the present invention to separate mixtures of high molecular hydrocarbons into two or more fractions having different molecular weights and/or internal pressures with the aid of a low molecular hydrocarbon treating agent by selectively precipitating certain components of the initial mixture from a solution containing the mixture and the treating agent.

Briefly, the process according to the present invention comprises the steps of commingling the mixture of high molecular substances, or a solution of the mixture in a suitable solvent, with a low molecular hydrocarbon treating agent, heating the resulting mixture to a temperature above the critical temperature of the low molecular treating agent at a constant or increasing pressure sufficient to cause at least a major portion of the treating agent to have a density greater than its critical density, thereby lowering the density of the treating agent and causing the formation of a lighter liquid phase and a heavier phase, which may be either liquid or solid. The heating is controlled so that each of these phases contains a portion or fraction of the initial mixture. These phases are then separated by any physical means, such as settling and decantation, or centrifuging, without changing their compositions. After the separation of the heavy phase, the temperature of the remaining phase may again be raised, at constant or increasing pressure, with or without the further addition of low molecular treating agent.

The initial mixture and the treating agent may be commingled at any desired pressure, and the low molecular treating agent may be introduced either in a gaseous or liquid state. In the latter case, at the initial temperature, all of the high molecular mixture may be dissolved in the treating agent; but in some cases a portion of the mixture will at first be insoluble in the liquid low molecular treating agent, and it is desirable to separate the insoluble substances from the solution before heating. Thus, asphaltic and resinous substances will generally be precipitated from petroleum oils even at ordinary temperatures, and it is often advantageous to separate these before heating the solution in accordance with the present process. In the present specification and claim, a phase having a density greater than the critical density of the low molecular treating agent is designated as "liquid," and a phase having a lower density is designated as a "gas."

My process is based on the following considerations: The "dissolving capacity" of low molecular substances with regard to high molecular substances depends upon the density of the former, in the sense that the less the density, i. e., the number of molecules per unit volume, multiplied by the weight of one molecule, the less the "dissolving capacity." On the other hand, the solubility of the high molecular substances in the "liquid" low molecular treating agent decreases with increasing molecular weight of the high molecular substances. Thus, if it is possible sufficiently to reduce the density of such a treating agent in which a high molecular mixture is dissolved, the high molecular mixture will separate into two liquid or non-gaseous phases, provided that the temperature is not too high. The heavier of these phases will contain the higher molecular substances which have now become "insoluble" and the other will be a solution of the lower molecular substances of the high molecular mixture in the treating agent. These liquid phases may be separated in any suitable manner. After this separation, the density of the low molecular treating agent in the lighter liquid phase may again be reduced by a further increase of the temperature, whereby the mixture is again caused to separate into two non-gaseous phases of different specific gravities. By repeating this treatment on successive light liquid phases in a series of steps, and using progressively higher temperatures, the high molecular mixture may be fractionated into any desired number of fractions having different properties.

I have found that by increasing this temperature it is possible to vary the density of the treating agent to a degree sufficient to effect the above stated separations when operating at temperatures above the critical temperature of the treating agent, in view of the fact that at these temperatures a relatively small increase in the temperature will cause an appreciable decrease in the density of the "liquid" treating agent.

The upper limit of the useful operating temperature is generally determined by the considerations that the high molecular substances must not undergo decomposition, and that at greatly elevated temperatures the high molecular substances are more highly miscible with one another, and their demixing at excessively high temperatures is impossible. The highest temperature is, therefore, preferably low enough to cause the high molecular substances to be in their "normal liquid state," i. e., to be at a temperature below their para-critical temperature. It must not exceed the critical temperature of the combined mixture of high molecular substances and treating agent.

Further, it is advantageous to operate under the lowest pressures possible, without, however, operating at pressures which are so low that an increase in the temperature merely results in the evaporation of the treating agent, without the consequent expansion of the solution containing the latter. A slight evaporation of the gaseous treating agent may, however, occur, provided that the density of unevaporated portion of the treating agent is effectively lowered to cause the desired separation of the high molecular mixture into two liquid phases. Consequently, if the danger of undesired evaporation arises, the pressure is raised, preferably simultaneously with the heating, so that at most only a small quantity of gas phase is present. Thus, in that case, the treatment is carried out orthobarically.

The quantity of the low molecular treating agent which must be in the liquid phase depends upon the relative solubilities of the components of the high molecular mixture, and upon the compressibility of the treating agent at the temperature of operation. In most cases from two to ten parts by weight of the low molecular treating agent to one part by weight of the dissolved high molecular mixture are suitable, although these limits may in certain cases be exceeded.

As low molecular treating agent I may employ any low boiling hydrocarbon, such as methane, ethane, propane, normal- or iso-butane, normal- or iso-pentane ethylene, acetylene, natural gas, dry natural gas, and mixtures thereof. Since the process is to be carried out at temperatures in excess of the critical temperature of the low molecular treating agent, it is necessary to choose a treating agent with a low enough critical temperature to permit the process to be operated at temperatures which will not cause the decomposition of the high molecular hydrocarbons, and will not prevent the formation of two non-gaseous phases, since a rise in temperature is generally accompanied with a corresponding increase in the miscibility of the components of the high-molecular mixture. In view of these requirements, I prefer to employ hydrocarbons having less than six carbon atoms in the molecule, although hydrocarbons having up to eight carbon atoms may at times be employed for the separation of very viscous oils.

The high molecular mixture may also be treated in the presence of an added solvent which improves its solubility in the treating agent, or which is effective to change the character of the fractions produced. Thus, the mixture may be first dissolved in such liquid solvents as propane, propylene, butane, hexane, light straight run napthas and other light preferably aromatic free fractions of mineral oil. Alternatively, or in conjunction with the above hydro-carbon solvents, a solvent from the group of solvents known as selective solvents for naphthenic (or aromatic) hydrocarbons may be employed. Examples of these are: sulfur dioxide (at temperature below para-critical i. e. below about 100° C.) furfural, nitrobenzene, BB' dichloroethyl ether, creslyic acid, phenol, aniline, quinoline, and a large number of others, their mixtures or their solutions with diluents. These solvents may be added either initially, or at an intermediate stage in the process. I prefer to add the selective solvents in amounts low enough to cause the oil to be in a single liquid phase at the temperature of the treatment in the absence of the treating agent.

The added solvent should preferably have a critical temperature higher than that of the low molecular treating agent. Thus, when propane is used as the low molecular treating agent, butane or a higher boiling solvent should be employed as the added solvent; and when $SO_2$ is used as the added solvent, methane or ethane is preferably used as the treating agent.

Figure 2:
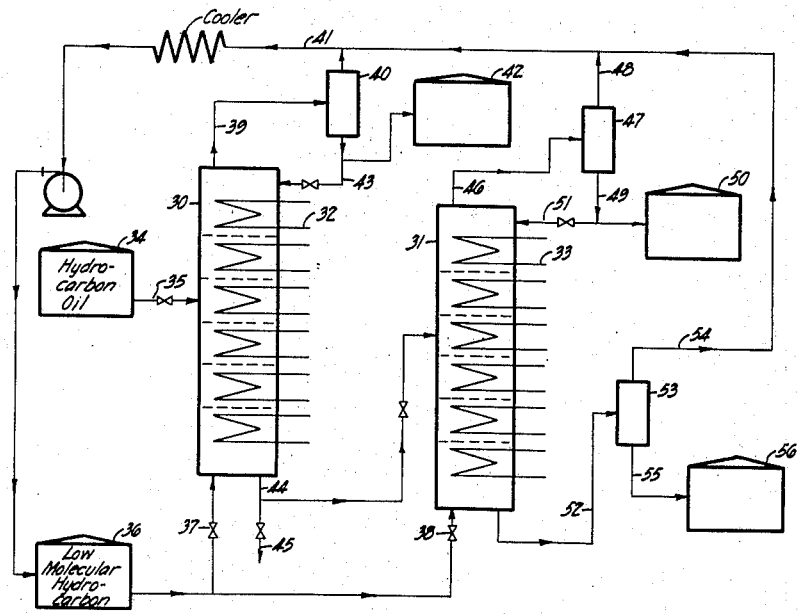

The process may, for example, be carried out in the apparatus shown in the accompanying drawing, in which Figure 1 is a schematic flow diagram of one form of apparatus suitable for practicing my invention, and Figure 2 is a similar diagram of another form of apparatus.

Referring to Figure 1, 1 is a treating vessel, adapted to contain the mixture undergoing treatment under the requisite temperature and pressure, and provided with a stirring apparatus 2 and with means for controlling the temperature, such a coil, or a jacket 3, as shown, constructed to receive a heating or cooling fluid. The hydrocarbon oil is fed into the vessel 1 from a tank 4 through a valve 5. If desired, an added solvent may be introduced from a tank 6 through a valve 7. A low molecular treating agent is introduced through a conduit 8, pump 9, pressure tank 10, and valve 11. The treating agent may be introduced either in the liquid or gaseous state, depending on the temperature and pressure, but after the temperature is raised as described below, the conditions in the vessel 1 are such that at most a very small quantity of the treating agent is present as a separate gas phase. The valve 11 is then closed, and the substances are mixed with the aid of the stirring apparatus 2. After mixing, the solution is allowed to remain quiescent, and the undissolved substances, if any, allowed to settle from the liquid solution of high molecular substances and treating agent to the lower conical portion of the vessel, from which they may be removed through the valves 12 and 13 to a separating apparatus 14, in which the entrained treating agent is removed from the undissolved substances, preferably by expending the treating agent near to or above its critical temperature at an elevated pressure to precipitate high molecular substances therefrom if desired, through the application of heat, and returned to the tank 10 through a conduit 15, the undissolved substances being led to tank 16.

If the oil contains asphaltic substances which have not been removed by a previous treatment, the undissolved materials in the first fraction will be largely asphaltenes. These may be separated already at ordinary or slightly elevated temperatures. It is, however, often desirable to deasphalt the hydrocarbon oil before introducing it into the vessel by known methods, as by dissolving the oil in a liquid precipitant for asphaltenes, such as propane or butane. The deasphalting agent, or a portion thereof, may be retained in the oil solution, replacing or supplementing the solvent from the tank 6. Moreover, in certain cases, as where a low molecular deasphalting or dewaxing agent with a low critical temperature, such as propane, has been employed, it may be employed as the treating agent, thereby obviating the use of the tank 110.

The solution remaining in the tank 1, is then heated at constant or increasing pressure, e. g., under its own vapor pressure, to a temperature at which the mixture separates into two non-gaseous phases. The heavier phase, e. g. a heavy cylinder oil, is then drawn off at a constant temperature by opening the valve 12, and fed through a valve 17 into separating apparatus 18, which may be similar to the apparatus 14, in which the pressure of the withdrawn phase is reduced, and the treating agent separated, the heavy fraction being fed to the tank 19.

After the withdrawal of the above described heavy phase, the valve 12 is closed, and the temperature again raised, under the conditions already described, causing a further expansion of the solution remaining in the tank 1, and a further separation of the mixture into two phases. In this manner successive heavy fractions are drawn off through the valves 23 and 24, freed from the propane in the apparatus 25 and 26, and led to storage tanks 27 and 28, it being understood that any number of fractions may be produced by regulating the size of the temperature increments. Most of the treating agent will remain in the lighter phases, the last one of which is similarly withdrawn as the last fraction. If a solvent from the tank 6 has been employed, the apparatus 14, 18, 25 and 26 may be operated to separate the solvent as a separate product, or, if desired, separate distillation units may be provided.

Instead of opening and closing the valve 12 at each stage of the process, the mixture can be heated and the heavier phase drawn off continuously, the product leaving the vessel being after proper time intervals led to the different storage tanks by manipulating the valves 13, 17, 23 and 24, in a manner similar to distillation.

The pressure may be further controlled by introducing additional quantities of treating agent, or by the aid of a piston, or by introducing or withdrawing an inert liquid which is immiscible with the substances being treated, e. g., water, mercury, and the like. This inert liquid may, for example, be forced into the vessel 1 by means of a pump 20, connected to a reservoir 21, a trough 22 being provided in the vessel 1 for receiving the liquid.

The above process can also be carried out continuously by providing a series of treating vessels, similar to the vessel 1, and flowing the lighter phase from each vessel into the next vessel in the series. In this mode of operation the process is preferably carried out at a constant pressure, although increasing pressures may be employed by providing pumps between adjacent treating vessels.

One preferred mode of operating the process continuously is illustrated in Figure 2, in which 30 and 31 represent contact towers, provided with temperature insulating means and with heating coils 32 and 33, by means of which the temperature in the tower may be progressively increased from the bottom to the top. The towers may be packed with contacting means. A heavy hydrocarbon oil, preferably free from asphaltic and resinous materials is continuously fed from the tank 34 through a valve 35 to the top or to an intermediate point in the tower, and a low molecular treating agent from the tank 36 is fed through the valve 37 into the bottom of the tower.

In the tower 30 the oil is partly dissolved in the treating agent, the components having the higher molecular weights and/or higher internal pressures flowing downwardly countercurrently to the treating agent, and the components having lower molecular weights and/or lower internal pressures being dissolved in the treating agent, which is under a sufficient pressure to be in the "liquid" state, i. e., to have a density greater than its critical density. The temperature is adjusted so that there are two non-gaseous phases at all points in the column, the solvent power of the treating agent being highest near the bottom of the tower, and lowest near the top. The treating agent, together with the dissolved substances, is withdrawn at 39 and is treated in a still 40 wherein the treating agent is separated from the high-molecular substances, the former being condensed and returned to the tank 36 through a conduit 41, and the latter being condensed and collected in a tank 42. If desired, the fractionation may be improved by returning a portion of the recovered high molecular substances to the top of the tower through a conduit 43.

The insoluble components of the mixture, together with a small amount of treating agent, are withdrawn from the tower at 44 and may be withdrawn at 45 as a product, or may be further fractionated by being introduced into the tower 31 at an intermediate point. This tower may be operated at the same pressure as the tower 30, or at a different pressure, the same or a different treating agent being introduced at the bottom through a valve 38. The pressure and temperature in the tower 31 are preferably such that the solvent power of the treating agent near the point at which the mixture is introduced is at least as great as that near the bottom of the tower 30.

A similar fractionation is effected in the tower 31, and the treating agent, together with dissolved material, is withdrawn at 46, and separated in the still 47, the treating agent being withdrawn at 48 and the dissolved substances at 49. The dissolved substances produced at 49 constitute an intermediate product, and may be run off to the tank 50. If desired, the fractionation in the tower 31 may be improved by returning a portion of the intermediate product through a conduit 51.

The insoluble components of the mixture, together with a small amount of the treating agent, are withdrawn from the tower at 52 and similarly separated in the still 53, the treating agent being withdrawn at 54 and the insoluble material being withdrawn at 55 and fed to the tank 56.

As compared with distillation, the process according to this invention has the great advantage that high boiling mixtures can be split up into fractions without danger of cracking. It is even possible to obtain very high molecular fractions, which cannot be obtained by usual distillation because of the simultaneous cracking of these components.

My process can, if desired, be combined with other processes usually employed to effect the separation of mixtures, such as chemical refining, distillation, extraction, dewaxing, etc. Oil may be dewaxed either before or after being fractionated according to my process.

As further examples of mixtures of high molecular substances which can be separated according to my process, may be mentioned lubricating oil obtained by polymerization of olefines and mixtures of substances obtained after the separation of asphaltenes from asphalt.

While the separation effected by my process is mainly on the basis of molecular weight, and is for this reason analogous to distillation, I have found that the compositions of the several fractions produced are not exactly the same as fractions produced by distillation. Thus, the heavier fractions produced by my process, and especially the first heavy fractions, are somewhat more aromatic than the oil remaining dissolved in the corresponding light phase, so that it becomes possible to apply my process to the manufacture of paraffinic oils by the separation of heavy aromatic portions in the first heavy phase or phases. Moreover, the different hydrocarbons which are present in the heavy phases have different boiling temperature ranges, the highest boiling hydrocarbons in any one fraction having the highest viscosity index, and being more paraffinic while the lower boiling hydrocarbons occurring in the same fraction are more aromatic in nature.

Example 20 parts by weight of a residual mineral oil fraction were deasphaltized and freed from resin and thereafter completely dissolved at room temperature in 80 parts by weight of commercial propane (critical temperature about 100° C.). The solution was heated until the pressure amounted to about 120 kg./cm$^2$. While keeping this pressure constant the solution was further heated. At 123° C. demixing of the solution took place, at 132° C. the heaviest fraction was withdrawn. On further heating at 132° a second fraction began to separate out; this fraction was withdrawn at 146° C. The properties of the fractions obtained were as follows:

| Fractions | Separated out between— | Yield in percent by weight | $d_4^{25}$ | Viscosity in ° Saybolt at 210° F. |
|---|---|---|---|---|
| 1 | 123–132 | 30 | 0.940 | 120 |
| 2 | 132–146 | 35 | 0.936 | 80 |
| Remained in solution | | 35 | 0.896 | |
| Original oil | | | 0.921 | 55 |

As used in the present specification and claim, the term "mixture" is used to designate any state of aggregation, whether homogeneous or heterogeneous, while the term "solution" is used to designate a substantially homogeneous phase.

I claim as my invention:

A continuous process for separating a high molecular hydrocarbon oil into portions having different properties, comprising the steps of introducing said oil into a countercurrent contact zone at an intermediate point thereof, flowing a stream of a liquid low boiling hydrocarbon treating agent countercurrently to said oil through the contact zone at an increasing temperature, the temperature of the treating agent at at least one point in said zone at which the counterflowing streams of oil and treating agent are separated being higher than its critical temperature, and the pressure at said point being sufficient to prevent the formation of a substantial amount of a gas phase, thereby forming a light liquid phase and a heavier phase, withdrawing said phases near opposite ends of the contact zone, removing at least a portion of the treating agent from the withdrawn light liquid phase, and returning a portion of the oil thus obtained from the withdrawn light liquid phase to the contact zone near the point of withdrawal of the light liquid phase.

ALBERT SCHAAFSMA.